United States Patent
Hozumi

(10) Patent No.: US 11,751,503 B2
(45) Date of Patent: Sep. 12, 2023

(54) JOB-SITE TOOL

(71) Applicant: MAKITA CORPORATION, Anjo (JP)

(72) Inventor: Akihiro Hozumi, Anjo (JP)

(73) Assignee: MAKITA CORPORATION, Anjo (JP)

( * ) Notice: Subject to any disclaimer, the term of this patent is extended or adjusted under 35 U.S.C. 154(b) by 892 days.

(21) Appl. No.: 16/699,338

(22) Filed: Nov. 29, 2019

(65) Prior Publication Data

US 2020/0187415 A1 Jun. 18, 2020

(30) Foreign Application Priority Data

Dec. 12, 2018 (JP) ................................ 2018-232689

(51) Int. Cl.
*A01D 34/416* (2006.01)
*A01B 1/06* (2006.01)
*A01D 34/68* (2006.01)

(52) U.S. Cl.
CPC ............ *A01D 34/416* (2013.01); *A01B 1/065* (2013.01); *A01D 34/68* (2013.01)

(58) Field of Classification Search
CPC ....... A01D 34/416; A01D 34/68; A01B 1/065
USPC .................................................. 30/276, 277.4
See application file for complete search history.

(56) References Cited

U.S. PATENT DOCUMENTS

| 2009/0217637 | A1* | 9/2009 | Dunn | A01D 34/416 56/13.6 |
| 2014/0008088 | A1* | 1/2014 | Chellew | B25F 5/021 362/559 |
| 2021/0234430 | A1* | 7/2021 | Momiyama | A01G 3/086 |
| 2021/0252688 | A1* | 8/2021 | Nyberg | A01G 3/067 |

FOREIGN PATENT DOCUMENTS

| JP | H09-180608 A | 7/1997 |
| JP | 2011-136378 A | 7/2011 |
| JP | 5515736 B2 | 6/2014 |

OTHER PUBLICATIONS

Jun. 30, 2022 Office Action issued in Chinese Patent Application No. 201911226015.9.
May 31, 2022 Office Action issued in Japanese Patent Application No. 2018-232689.

* cited by examiner

*Primary Examiner* — Omar Flores Sanchez
(74) *Attorney, Agent, or Firm* — Oliff PLC

(57) ABSTRACT

A job-site tool in one aspect of the present disclosure includes and a display. The display is configured to display information regarding the job-site tool. The display includes a circuit board, at least one light emitter, an electric conduction member, at least one lens, and a resin member. The at least one lens is provided on the circuit board to cover the at least one light emitter. The resin member includes a lens cover area that covers surroundings of the at least one lens to thereby secure the at least one lens to the circuit board, and an electric conduction cover area that covers the electric conduction member.

9 Claims, 13 Drawing Sheets

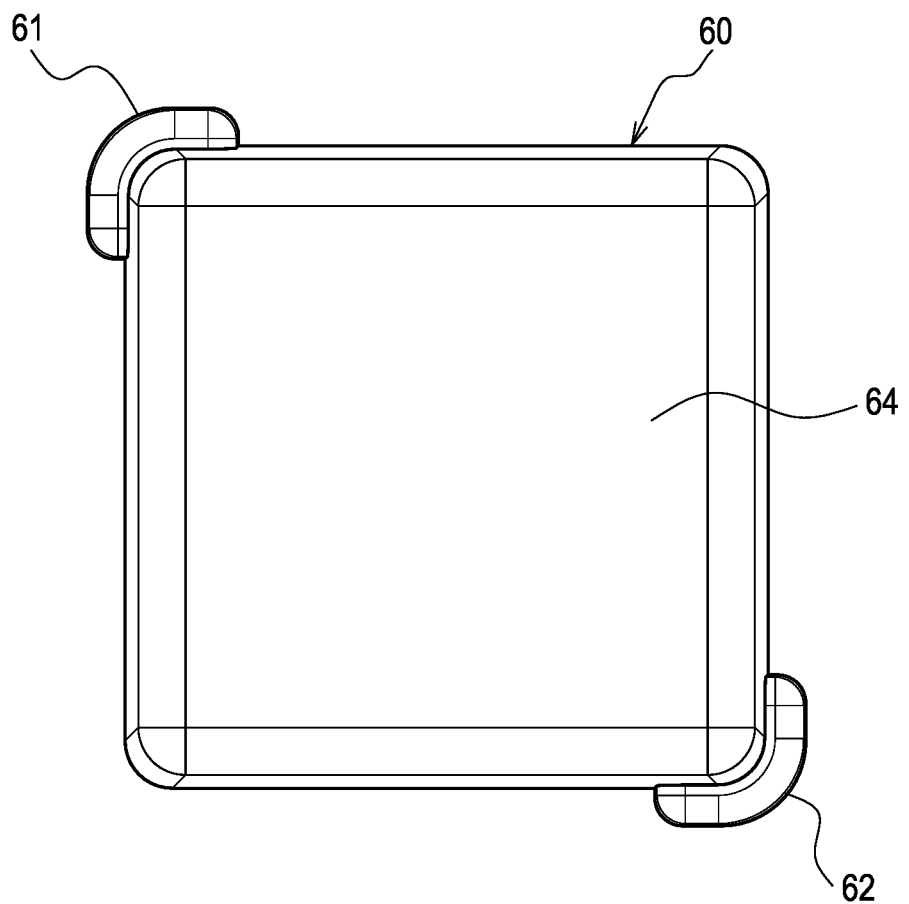
FIG. 4
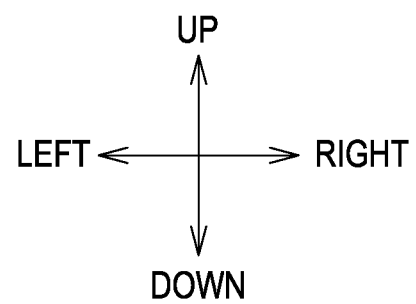

JOB-SITE TOOL

CROSS-REFERENCE TO RELATED APPLICATIONS

The present application claims the benefit of Japanese Patent Application No. 2018-232689 filed on Dec. 12, 2018 with the Japan Patent Office, the entire disclosure of which is incorporated herein by reference.

BACKGROUND

The present disclosure relates to a job-site tool with a display.

A rechargeable impact driver disclosed in Japanese Patent No. 5515736 includes a tactile switch to switch among operation modes and an LED indicating an operation mode, a remaining energy of a battery, and other information.

In the aforementioned rechargeable impact driver, the tactile switch and the LED are provided on a circuit board, and an operation panel including holes is assembled to the circuit board. The operation panel is assembled to the circuit board such that positions of the holes correspond to respective positions of the tactile switch and the LED, and is integrated with the circuit board by a potting material. A thin plastic sheet is affixed to the operation panel, and the holes are covered with the plastic sheet.

SUMMARY

The aforementioned rechargeable impact driver inhibits infiltration of liquid into the LED or a current path of the LED using the plastic sheet. However, since the plastic sheet may come off or wear down, sufficient waterproof performance may not be achieved by simply affixing the plastic sheet. Thus, infiltration of liquid through the holes in the operation panel may result in a failure of the LED, or other components.

In one aspect of the present disclosure, it is preferable to provide a job-site tool including a display with an improved waterproof performance.

A job-site tool in one aspect of the present disclosure includes a display. The display is configured to display information regarding the job-site tool. The display includes a circuit board, at least one light emitter, an electric conduction member, at least one lens, and a resin member. The at least one light emitter is provided on the circuit board. The electric conduction member is configured to supply direct-current power to the at least one light emitter. The at least one lens is provided on the circuit board to cover the at least one light emitter. The resin member secures the at least one lens to the circuit board. The resin member includes a lens cover area and an electric conduction cover area. The lens cover area covers surroundings of the at least one lens. The electric conduction cover area covers the electric conduction member.

According to one aspect of the present disclosure, the at least one light emitter provided on the circuit board is covered with the at least one lens. The resin member covers the surroundings of the lens, thereby securing the lens to the circuit board. That is, the lens is secured to the circuit board not with an adhesive but with the resin member, and thus the lens is less likely to come off the circuit board. Also, the lens is more resistant to wear than a plastic sheet. Further, the electric conduction member is also covered with the resin member. Accordingly, infiltration of liquid into the light emitter and the electric conduction member can be inhibited, to thereby achieve an improved waterproof performance of the display.

The at least one light emitter may include light emitters. The at least one lens may include lenses. The light emitters may be arranged in an array on the circuit board. The lenses may cover the respective light emitters.

The light emitters are covered with the respective lenses. Thus, an improved waterproof performance of each of the light emitters can be achieved.

Also, the lens cover area may include at least one wall, and the at least one wall may be provided between two adjacent ones of the lenses.

The wall provided between the two adjacent lenses enables a further improved waterproof performance of each of the light emitters.

The resin member may be colored in a light-shielding color.

The resin member colored in a light-shielding color enables reducing interference of lights emitted by the light emitters. Particularly, the wall provided between two adjacent ones of the lenses can appropriately reduce interference of the lights emitted from the light emitters.

The electric conduction member may include a metal coupling member coupled to the at least one light emitter.

Since the metal coupling member is covered with the resin member, adhesion of liquid to the metal coupling member can be inhibited. Thus, occurrence of failures, such as short-circuit, during electric conduction to the light emitter can be reduced.

The lens cover area may be formed integrally with the electric conduction cover area.

Since the lens cover area covering the surroundings of the lens is formed integrally with the electric conduction cover area covering the electric conduction member, the resin member is less likely to come off as compared with a case where the lens cover area and the electric conduction cover area are formed separately. Thus, an improved waterproof performance of the display can be achieved.

The at least one lens may be transparent.

The transparent lens enables light emitted from the light emitter to be easily visible.

The at least one light emitter may include a light emitting surface configured to emit light. The at least one lens may include a facing surface that faces the light emitting surface. The lens cover area may cover an outer peripheral portion of the facing surface.

Since the outer peripheral portion of the facing surface of the lens is covered with the resin member, light emitted from the light emitting surface of the light emitter is visible through the facing surface of the lens, excluding the outer peripheral portion of the facing surface. Also, since the outer peripheral portion of the facing surface of the lens is covered with the resin member, direct contact with the facing surface can be avoided, and wear of the lens can be reduced.

The at least one lens may include two or more lenses, and the two or more lenses may be coupled to one another.

The two or more lenses coupled to one another enable easy positioning of the two or more lenses relative to the circuit board.

BRIEF DESCRIPTION OF THE DRAWINGS

An embodiment of the present disclosure will be described hereinafter by way of example with reference to the accompanying drawings, in which:

FIG. 4 is a plan view showing a large lens;

DETAILED DESCRIPTION OF EXEMPLARY EMBODIMENTS

<1. Overall Configuration>

Figure 1:
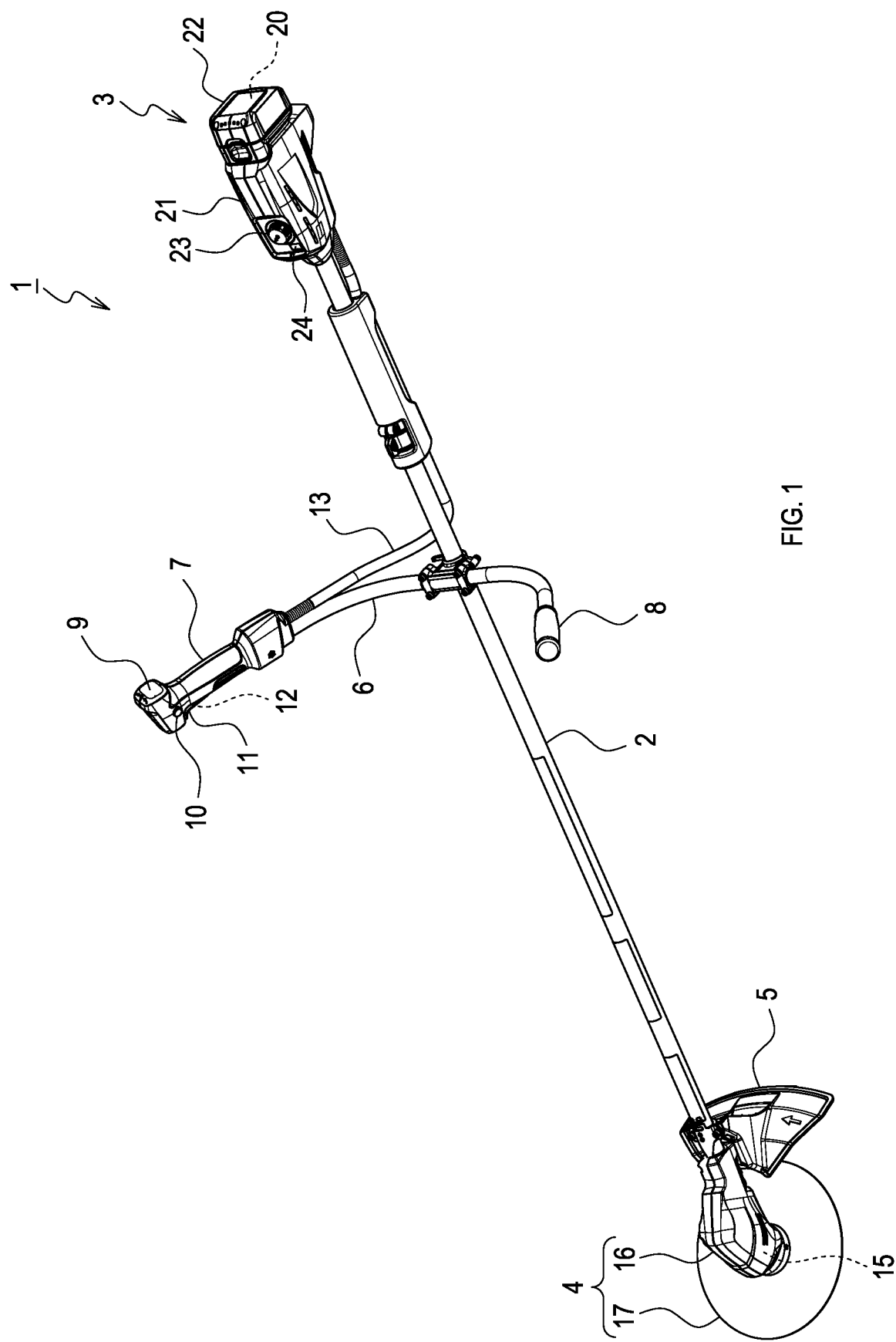
FIG. 1 is a perspective view showing an outer appearance of a grass cutter of the present embodiment.

First, a description will be given of an overall configuration of a grass cutter 1 in the present embodiment with reference to FIG. 1. The grass cutter 1 is one example of a job-site tool in one aspect of the present disclosure.

The grass cutter 1 includes a main pipe 2, a controller 3, a driver 4, a cover 5, and a handle 6.

The main pipe 2 has an elongated hollow rod shape. The controller 3 is provided at a rear end of the main pipe 2, and the driver 4 and the cover 5 are provided at a front end of the main pipe 2.

The driver 4 includes a motor housing 16 and a cutting blade 17. The cutting blade 17 is a working tool to cut a cutting object, such as grass and small-diameter trees. The cutting blade 17 is attachable to and detachable from the motor housing 16. The cutting blade 17, which is made of metal, has a disk shape with a saw-toothed edge along an entire outer circumference. The cover 5 is provided to avoid grass or the like that has been cut by the cutting blade 17 from flying toward a user of the grass cutter 1.

The motor housing 16 houses a motor 15 configured to generate a rotational force to rotate the cutting blade 17. The rotational force generated by driving of the motor 15 is transmitted through a deceleration mechanism to a working tool rotation shaft to which the cutting blade 17 is attached.

The handle 6 is U-shaped and is coupled to the main pipe 2 approximately in a longitudinal middle of the main pipe 2. The handle 6 includes a first end provided with a right grip 7 to be gripped by a user's right hand, and a second end provided with a left grip 8 to be gripped by the user's left hand.

A display 9, a lock-off button 10, and a trigger 11 are provided at a leading end of the right grip 7. The display 9 is arranged to be visible by a user and is configured to display information regarding the grass cutter 1. The information regarding the grass cutter 1 may include, for example, a remaining energy of a below-described battery 20, a rotational speed of the motor 15, and an operation mode of the motor 15.

The trigger 11 is an operation member that a user operates to instruct rotation or stop of the cutting blade 17. Arranged in the right grip 7 is a trigger switch 12 that operates interlockingly with the trigger 11. Upon pulling of the trigger 11, the trigger switch 12 is turned ON and outputs a trigger signal indicating an ON-state. Upon release of the trigger 11, the trigger switch 12 is turned OFF and outputs a trigger signal indicating an OFF-state.

The lock-off button 10 is a button to prevent or reduce malfunction of the cutting blade 17. In a state where the lock-off button 10 is not pressed, the lock-off button 10 mechanically engages with the trigger 11. This restricts movement of the trigger 11, to thereby prevent or inhibit the trigger switch 12 from entering the ON-state. In a state where the lock-off button 10 is pressed, engagement between the lock-off button 10 and the trigger 11 is released.

A control wiring pipe 13 is provided between a lower end of the right grip 7 and a front end of the controller 3. The control wiring pipe 13 has a hollow tubular shape and has elasticity. A control harness is arranged inside the control wiring pipe 13. The control harness is a wire to electrically connect the display 9 and the trigger switch 12 to the controller 3.

The controller 3 includes a rear-end housing 21 and a battery pack 22. The battery pack 22 is attachable to and detachable from a rear end of the rear-end housing 21.

The battery pack 22 contains a battery 20. The battery 20 is a rechargeable power source to supply direct-current power to various components in the rear-end housing 21 and to the motor 15. The battery 20 includes, for example, a lithium iron rechargeable battery.

In a front end portion of the rear-end housing 21, a speed adjustment dial 23 and a main switch 24 are provided so as to be operable by a user. The speed adjustment dial 23 is configured to allow the user to variably set the rotational speed of the motor 15. The main switch 24 is a switch to cause the battery 20 to start supplying power to the various components, to thereby enable use of the grass cutter 1. The grass cutter 1 also includes a forward/reverse selector switch (not shown) or the like to change a rotational direction of the motor 15 between a forward rotation and a reverse rotation.

<2. Configuration of Display>

Figure 2:
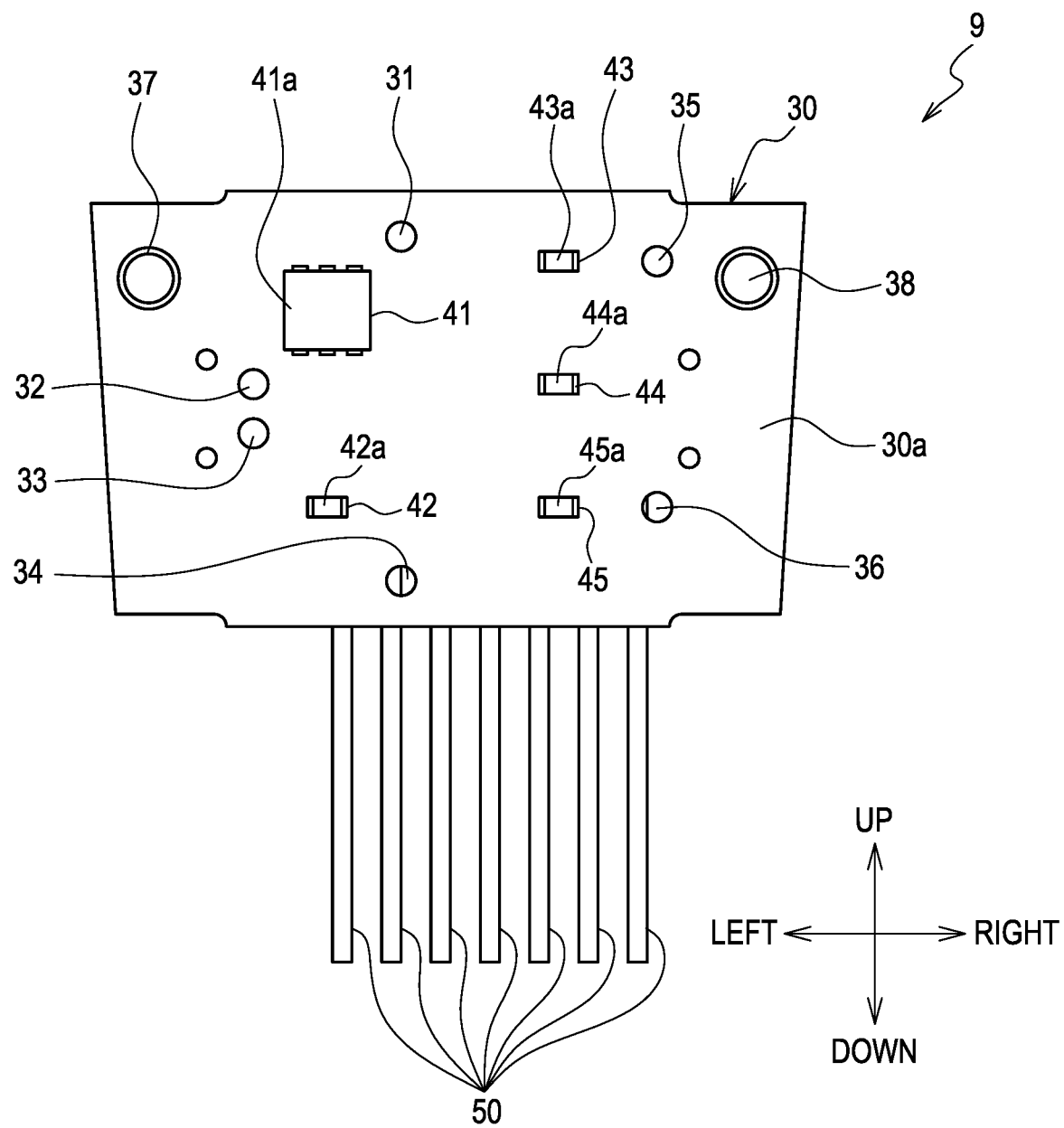
FIG. 2 is a plan view showing a front surface of a circuit board on which LEDs are mounted.

Next, a description will be given of a detailed configuration of the display 9 with reference to the drawings. As shown in FIG. 2, the display 9 includes a substantially rectangular printed circuit board (hereinafter, the "circuit board") 30 and five light emitting diodes (hereinafter, the "LED"s) 41, 42, 43, 44, 45. Here, a longitudinal direction of the circuit board 30 is referred to as a "left-right direction" and a short direction of the circuit board 30 is referred to as an "up-down direction". A side of the circuit board 30 on which the LEDs 41, 42, 43, 44, 45 are mounted is referred to as a "front side" and a side opposite to the front side is referred to as a "rear side". In the present embodiment, the LEDs 41, 42, 43, 44, 45 correspond to examples of a light emitter of the present disclosure.

The LEDs 42, 43, 44, 45 include respective light emitting surfaces 42a, 43a, 44a, 45a to emit light, and are each configured to be capable of emitting light of a single color. In contrast, the LED 41 includes a light emitting surface 41a to emit light, and is configured to be capable of emitting light of two colors (for example, red and green). Thus, the LED 41 is sized larger than each of the LEDs 42, 43, 44, 45. The LEDs 42, 43, 44, 45 are sized the same. The light emitting surfaces 41a, 42a, 43a, 44a, 45a each have a rectangular shape.

The LED 41 is arranged in an upper left part of a front surface 30a of the circuit board 30. The LED 42 is arranged below the LED 41 on the front surface 30a. The LED 41 and the LED 42 are aligned along the up-down direction in a left part of the front surface 30a.

The LED 43 is arranged in an upper right part of the front surface 30a of the circuit board 30. The LED 44 is arranged below the LED 43 on the front surface 30a. The LED 45 is arranged below the LED 44 on the front surface 30a. The LED 43, LED 44, and LED 45 are aligned equally spaced apart along the up-down direction in a right part of the front surface 30a.

The LEDs 41, 42, 43, 44, 45 are arranged on the front surface 30a with the respective light emitting surfaces 41a, 42a, 43a, 44a, 45a facing the front side, so as to have respective longitudinal directions consistent with the longitudinal direction of the circuit board 30.

Figure 3:
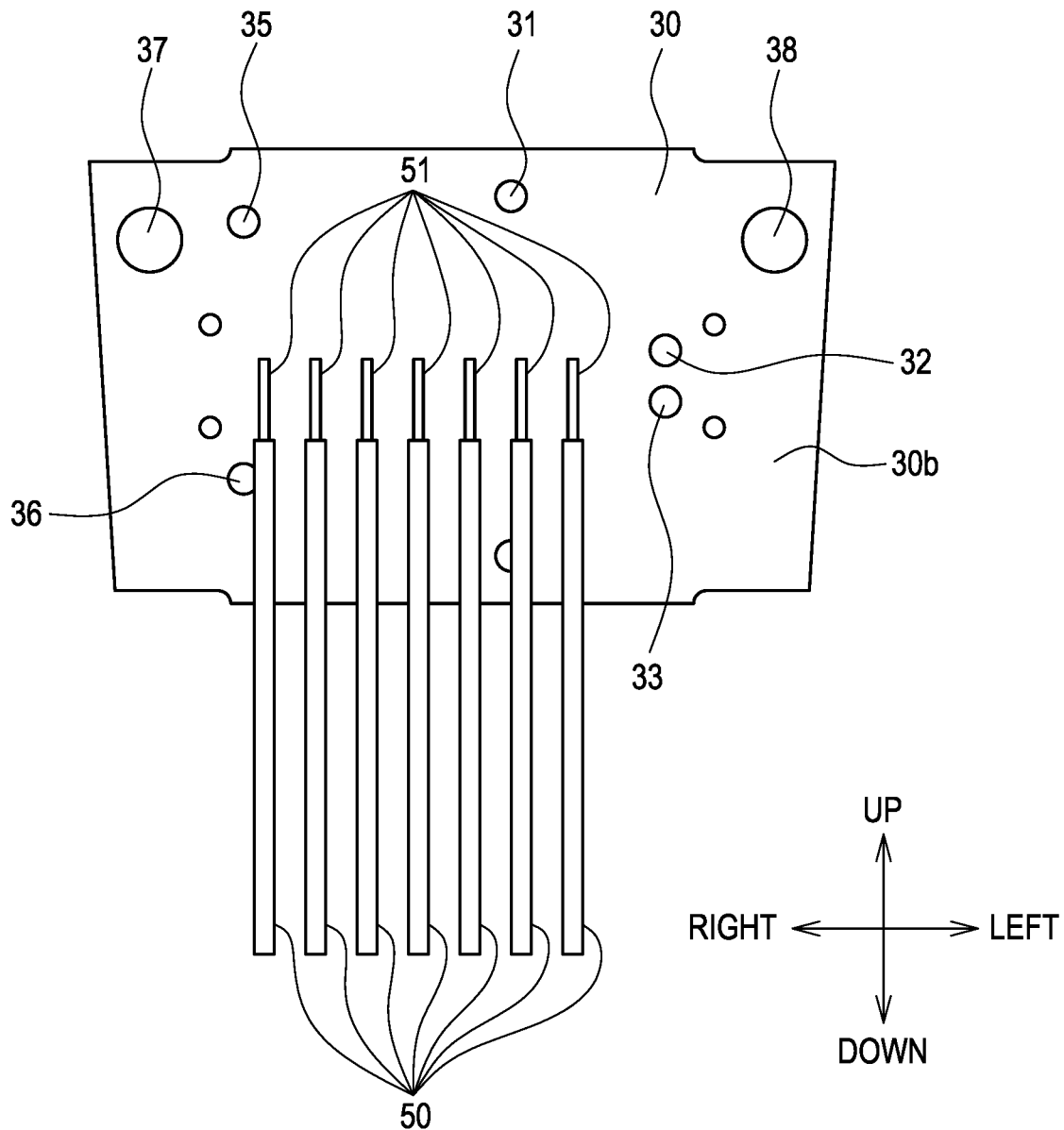
FIG. 3 is a plan view showing a rear surface of the circuit board to which leads are connected.

As shown in FIG. 3, the display 9 includes seven leads 50 to supply direct-current power from the battery 20 to the LEDs 41, 42, 43, 44, 45. The direct-current power here means general electric power without change in flow direction (that is, without change between positive and negative). A constant voltage may be supplied from the battery 20 to the display 9, or a specified voltage may be supplied in a pulse form.

One of the seven leads 50 is a ground line common to the LEDs 41, 42, 43, 44, 45. Four of the seven leads 50 are connected to the respective LEDs 42, 43, 44, 45. The remaining two leads 50 are connected to the LED 41 of two colors. Each of the leads 50 includes a core wire portion 51 in which a coating is removed and a metal core wire is exposed. The core wire portions 51 are each soldered to the circuit board 30 by a solder connection portion in a position corresponding to a copper foil provided to the circuit board 30. The leads 50 are connected to respective terminals of the LED 41, 42, 43, 44, 45 via the solder connection portions and copper-plated through holes. In the present embodiment, the lead 50 corresponds to one example of an electric conduction member of the present disclosure, and the core wire 51, the solder connection portion, and the copper foil correspond to one example of a metal coupling member of the present disclosure.

As shown in FIGS. 4, 5, 6, and 7, the display 9 further includes two large lenses 60 and a coupled lens 70. The two large lenses 60 are arranged on the circuit board 30 to cover the LEDs 41 and 42. The coupled lens 70 is arranged on the circuit board 30 to cover the LEDs 43, 44, and 45.

Figure 5:
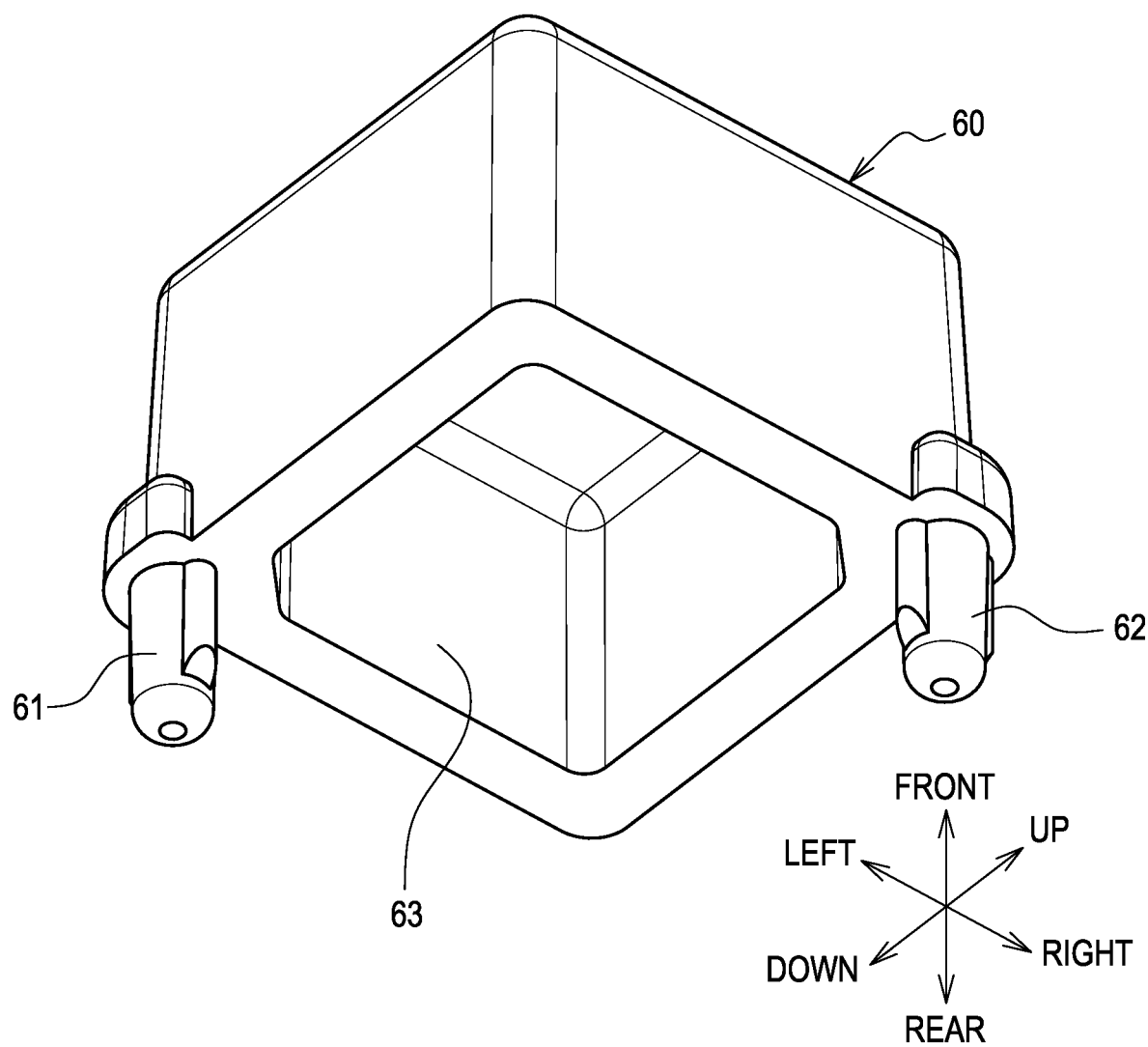
FIG. 5 is a perspective view showing the large lens.

As shown in FIGS. 4 and 5, the large lens 60 has a rectangular parallelepiped shape and includes a front surface 64, four side surfaces, and an opening that faces the front surface 64. The large lens 60 is sized to be capable of containing the LED 41 in an internal space 63 of the large lens 60. Also, the large lens 60 includes protrusions 61, 62 protruding from two opposed corners of four corner of the opening toward the rear side. The large lenses 60 are transparent lenses allowing transmission of lights emitted from the LEDs 41 and 42.

Figure 6:
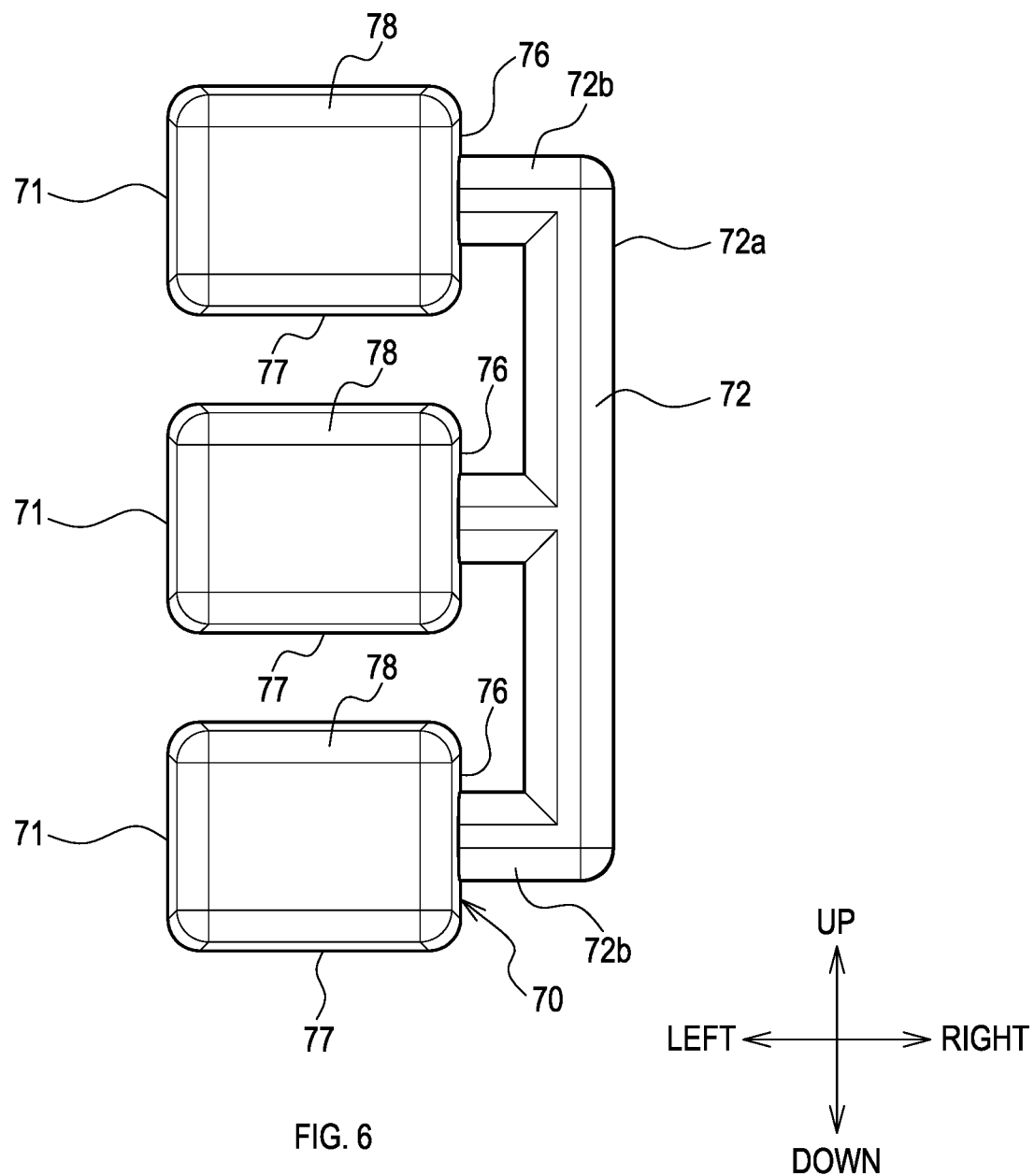
FIG. 6 is a plan view showing a coupled lens.
Figure 7:
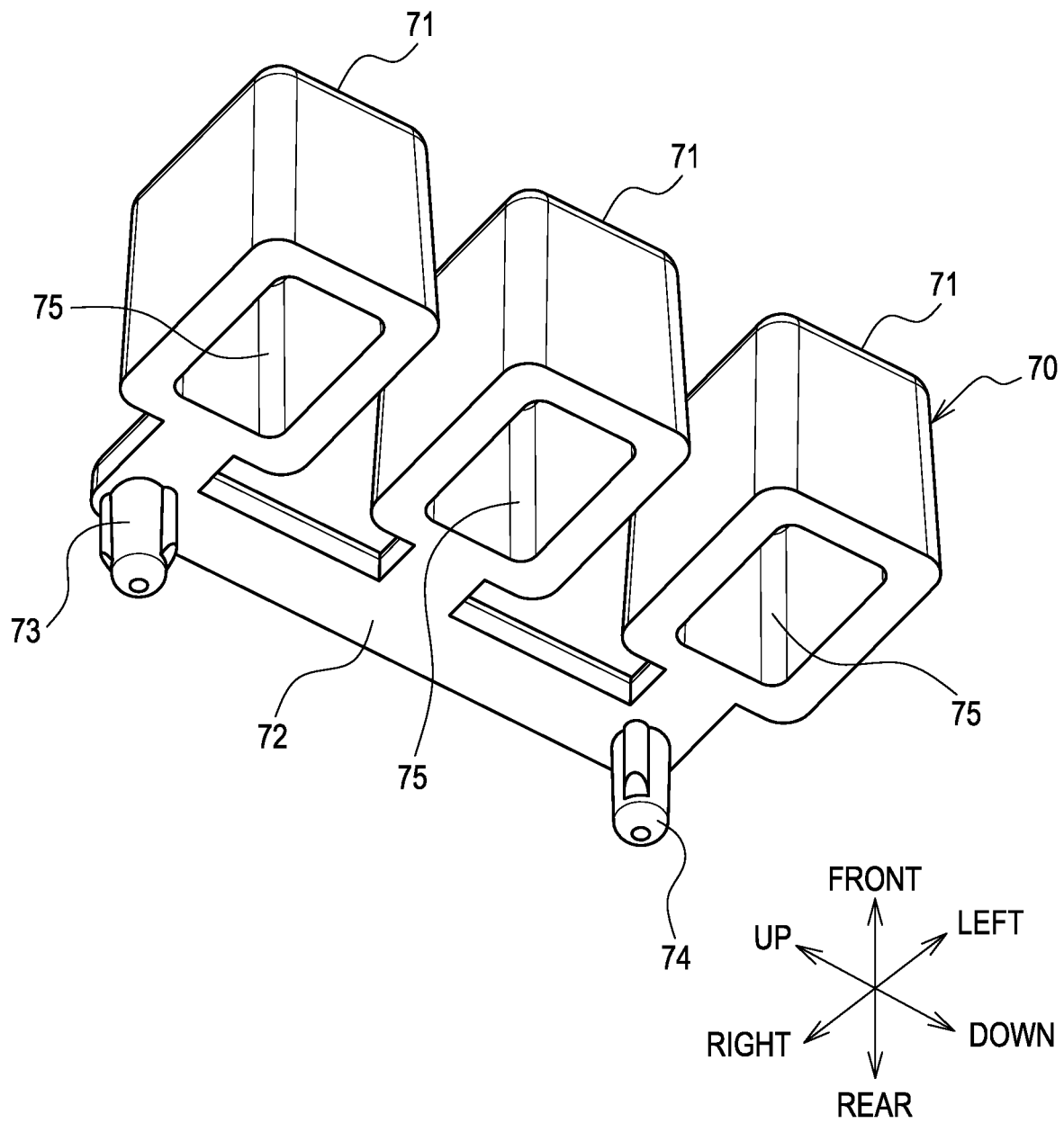
FIG. 7 is a perspective view showing the coupled lens.

As shown in FIGS. 6 and 7, the coupled lens 70 includes three small lenses 71 and a coupling portion 72. Each of the small lenses 71 has a rectangular parallelepiped shape and includes a front surface 78, four side surfaces, and an opening that faces the front surface 78. The four side surfaces include two side surfaces 76 connected to short sides of the front surface 78 and two side surfaces 77 connected to long sides of the front surface 78. The small lenses 71 are sized to be capable of containing the respective LEDs 43, 44, and 45 in their corresponding internal spaces 75. Also, the small lenses 71 are transparent lenses allowing transmission of lights emitted from the respective LEDs 43, 44, and 45.

The aforementioned "transparent lens" means a lens having light transmissivity allowing transmission of light, regardless of color of the lens, and includes not only a colorless transparent lens but also a colored light transmissive lens.

The three small lenses 71 are arranged along the up-down direction spaced apart so as to correspond to spacing of the LEDs 43, 44, and 45. The three small lenses 71 are aligned such that the side surfaces 76 are positioned along the up-down direction, and the side surfaces 76 of the small lenses 71 are coupled by the coupling portion 72. The coupling portion 72 includes a longitudinal part 72a extending along the up-down direction, three branch parts 72b extending from the longitudinal part 72a in the left-right direction in equal intervals. The branch parts 72b are joined to the respective side surfaces 76 of the small lenses 71. The coupling portion 72 also includes protrusions 73, 74 protruding from both ends of the longitudinal part 72a toward the rear side.

As shown in FIG. 2, the circuit board 30 includes mounting holes 31, 32, 33, 34, 35, 36 and attachment holes 37, 38. The mounting holes 31, 32 are arranged at upper-right and lower-left positions of the LED 41. The mounting holes 33, 34 are arranged at upper-left and lower-right positions of the LED 42. The mounting holes 35, 36 are arranged at respective right side positions of the LED 43 and LED 45. The attachment holes 37, 38 are arranged at a left upper end and a right upper end of the circuit board 30.

Figure 8:
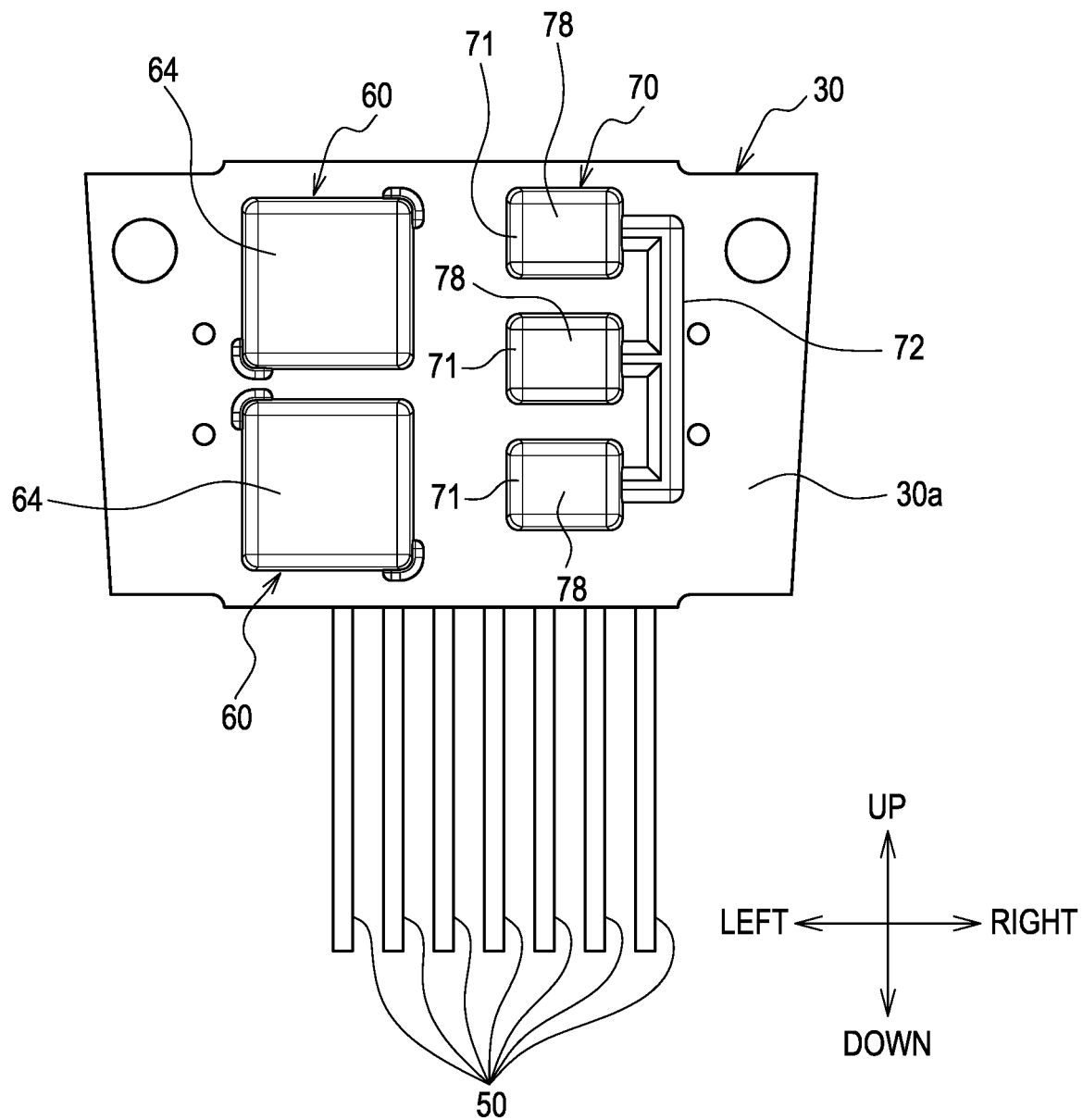
FIG. 8 is a plan view showing a state where the large lenses and the coupled lens are mounted on the circuit board.

The protrusions 61, 62 of the large lens 60 are inserted into the mounting holes 31, 32. Also, the protrusions 61, 62 of the large lens 60 are inserted into the mounting holes 33, 34. As a result, as shown in FIG. 8, the large lenses 60 are arranged on the circuit board 30 at positions corresponding to the LEDs 41, 42, and the LEDs 41, 42 are covered with the large lenses 60. Also, the protrusions 73, 74 of the coupled lens 70 are inserted into the mounting holes 35, 36. As a result, as shown in FIG. 8, the coupled lens 70 is arranged on the circuit board 30 at a position corresponding to the LEDs 43, 44, and 45, and the LEDs 43, 44, and 45 are covered with the small lenses 71. Further, cover protrusions 200 of a display cover 100 described below are inserted into the attachment holes 37, 38.

Figure 9:
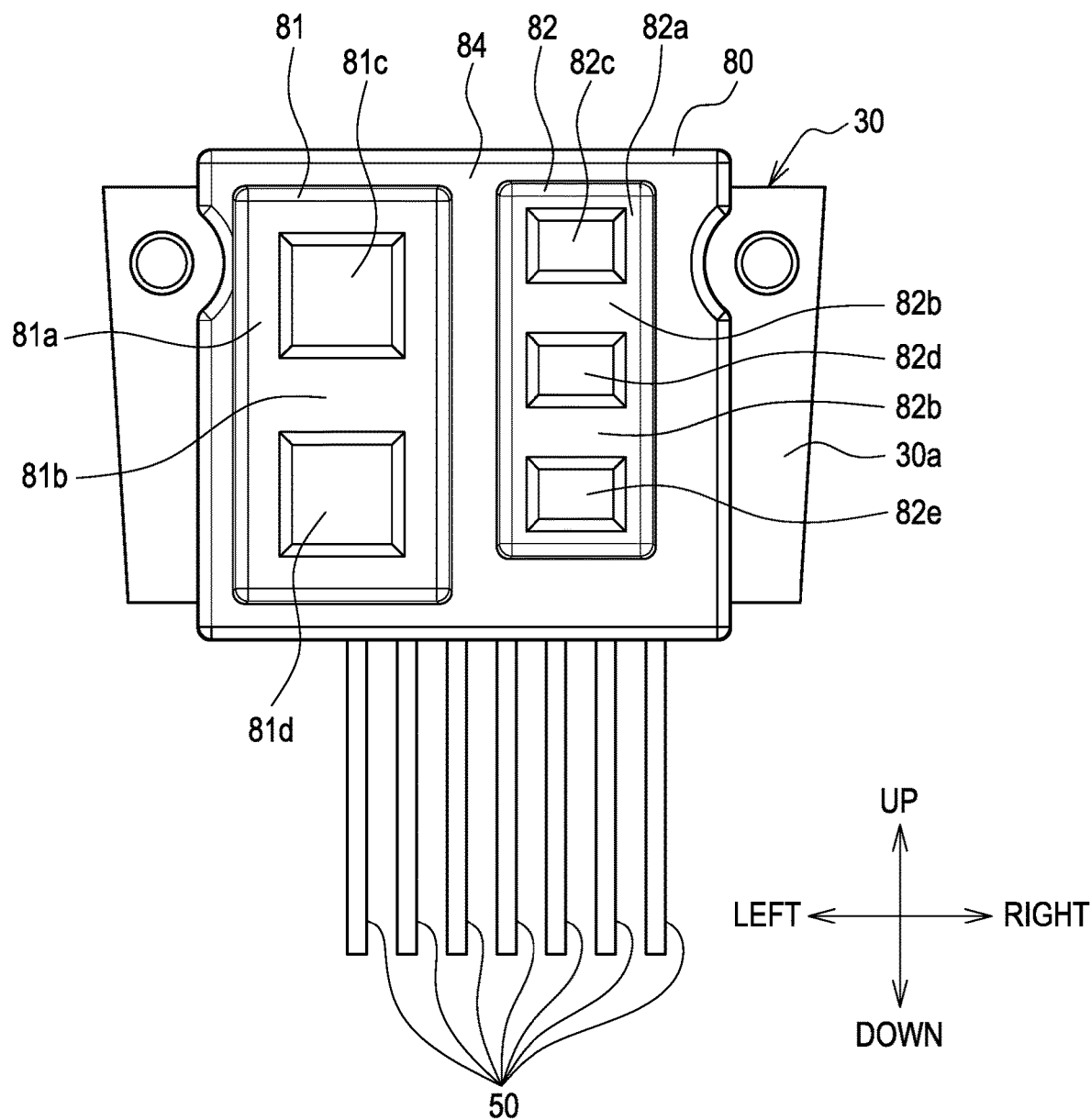
FIG. 9 is a plan view showing a state where the large lenses and the coupled lens are secured on the circuit board with a resin member.
Figure 10:
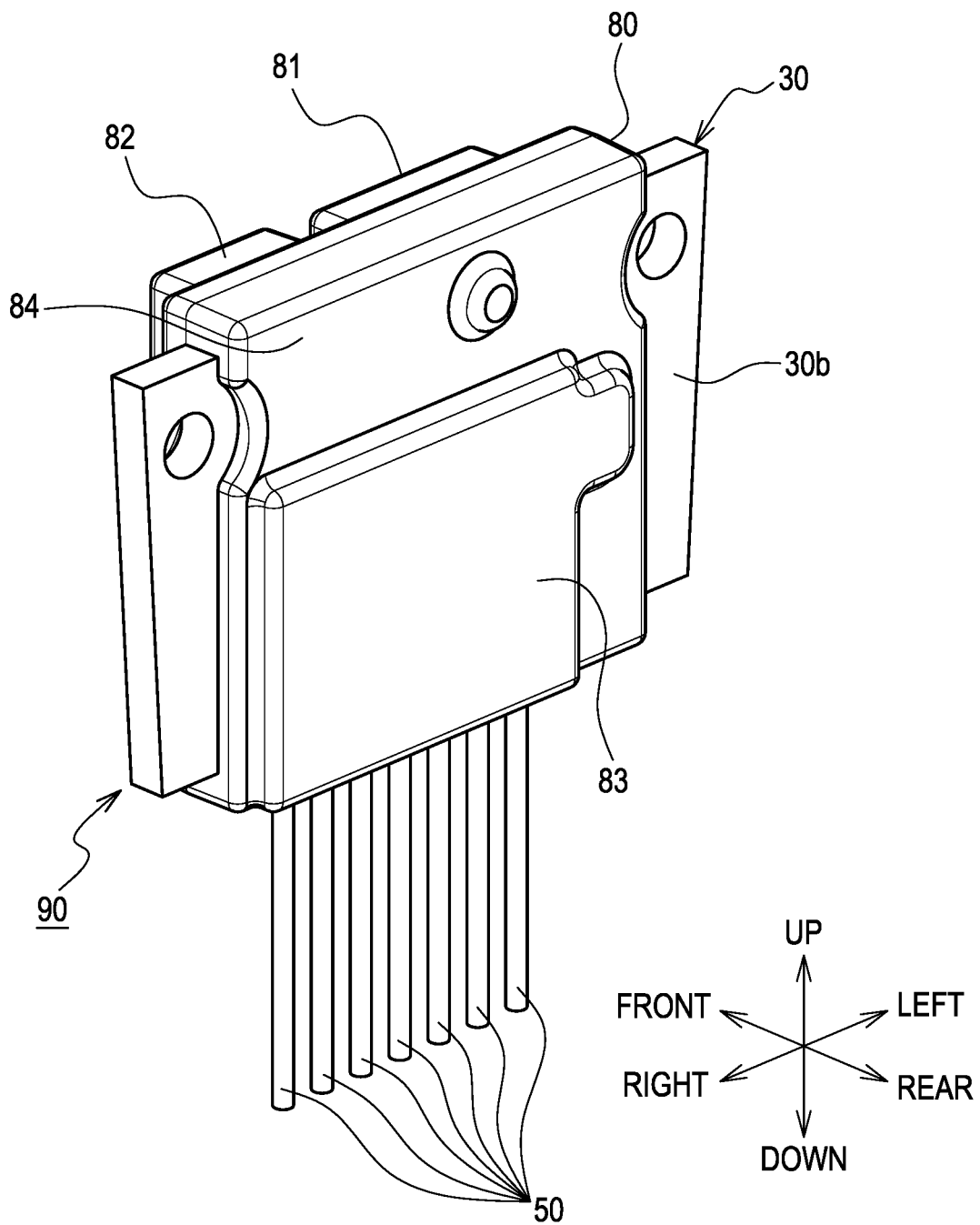
FIG. 10 is a perspective view showing a state where the large lenses and the coupled lens on the circuit board, and the leads on the rear surface of the circuit board are secured with the resin member.

As shown in FIG. 9 and FIG. 10, the display 9 includes a resin member 80 that covers surroundings of the large lenses 60 and the coupled lens 70, and a part of the seven leads 50, to thereby secure the large lenses 60, the coupled lens 70, and the seven leads 50 to the circuit board 30.

As shown in FIG. 9 and FIG. 10, the resin member 80 includes a first lens cover portion 81, a second lens cover portion 82, a lead cover portion 83, and a base portion 84. The resin member 80 is formed of a colored resin in a light-shielding color (for example, black).

At the front surface 30a of the circuit board 30, the first lens cover portion 81 covers, the surroundings of the two large lenses 60 arranged in the left part of the front surface 30a. Specifically, the first lens cover portion 81 includes a first outer peripheral portion 81a and a first wall portion 81b. The first outer peripheral portion 81a, which protrudes frontward from the front surface 30a of the circuit board 30, surrounds peripheries of the two adjacent large lenses 60. The first wall portion 81b, which protrudes frontward from the front surface 30a of the circuit board 30, is arranged between the two adjacent large lenses 60 and fills a space between the two large lenses 60. The first wall portion 81b inhibits light propagation from the LED 41 to the LED 42, and also inhibits light propagation from the LED 42 to the LED 41. That is, the first wall portion 81b inhibits light propagation between the LED 41 and the LED 42 adjacent to each other, to thereby reduce interference between a light emitted from the LED 41 and a light emitted from the LED 42.

The first outer peripheral portion 81a and the first wall portion 81b cover the surroundings of the large lenses 60 excluding respective facing parts, which face the light emitting surfaces 41a and 42a, of the front surfaces 64 of the large lenses 60. That is, the first outer peripheral portion 81a and the first wall portion 81b cover the side surfaces of the large lenses 60 and end portions of the front surfaces 64, but do not cover respective central portions of the front surfaces 64. Thus, the first lens cover portion 81 includes first cover openings 81c and 81d respectively facing the light emitting surfaces 41a and 42a. This inhibits infiltration of liquid into the LED 41 or 42, and enables propagation of the lights emitted from the LED 41 and 42 through the large lenses 60 and the first cover openings 81c and 81d.

At the front surface 30a of the circuit board 30, the second lens cover portion 82 covers the surroundings of the three small lenses 71 arranged in the right part of the front surface 30a. Specifically, the second lens cover portion 82 includes a second outer peripheral portion 82a and two second wall portions 82b. The second outer peripheral portion 82a, which protrudes frontward from the front surface 30a of the circuit board 30, surrounds peripheries of the three adjacent small lenses 71. An upper one of the two second wall portions 82b is arranged between the upper small lens 71 and the intermediate small lens 71, and fills a space between the upper small lens 71 and the intermediate small lens 71. The upper second wall portion 82b inhibits light propagation from the LED 43 to the LED 44 and inhibits light propagation from the LED 44 to the LED 43. A lower one of the two second wall portions 82b is arranged between the intermediate small lens 71 and the lower small lens 71, and fills a space between the intermediate small lens 71 and the lower small lens 71. The lower second wall portion 82b inhibits light propagation from the LED 44 to the LED 45, and inhibits light propagation from the LED 45 to the LED 44. That is, the two second wall portions 82b reduce interference between a light emitted from the LED 43 and a light emitted from the LED 44, and interference between a light emitted from the LED 44 and a light emitted from the LED 45.

The second outer peripheral portion 82a and the second wall portions 82b cover the surroundings of the three small lenses 71 excluding respective facing parts, which face the light emitting surfaces 43a, 44a, and 45a, of the front surfaces 78 of the three small lenses 71. That is, the second outer peripheral portion 82a and the second wall portions 82b cover the side surfaces and end portions of the front surfaces 78 of the three small lenses 71, and do not cover respective central portions of the front surfaces 78. Thus, the second lens cover portion 82 include second cover openings 82c, 82d, and 82e respectively facing the light emitting surfaces 43a, 44a, and 45a. This inhibits infiltration of liquid into the LEDs 43, 44, or 45, and enables propagation of the lights emitted from the LED 43, 44, and 45 through the small lenses 71 and the second cover openings 82c, 82d, and 82e.

The lead cover portion 83 covers respective upper parts of the leads 50 on a rear surface 30b of the circuit board 30. Specifically, the lead cover portion 83 covers respective upper parts of the leads 50, including respective metal portions 51 of the leads 50. This inhibits adhesion of liquid to the metal portions 51, thereby reducing failures, such as short-circuit.

The base portion 84 generally covers the front surface 30a and the rear surface 30b of the circuit board 30 except for the attachment holes 37 and 38 in such a manner that the first lens cover portion 81, the second lens cover portion 82, and the lead cover portion 83 are continued. The first lens cover portion 81 and the second lens cover portion 82 protrude from the front surface 30a more frontward than the base portion 84. Also, the lead cover portion 83 protrudes from the rear surface 30b more rearward than the base portion 84.

The first lens cover portion 81, the second lens cover portion 82, the lead cover portion 83, and the base portion 84 are integrally formed with resin. For example, the resin member 80 is formed by injecting resin into dies configured to hold the circuit board 30 from the front side and the rear side. In the present embodiment, the first lens cover portion 81 and the second lens cover portion 82 each correspond to one example of a lens cover area of the present disclosure, the first wall portion 81b and the second wall portion 82b each correspond to one example of a wall of the present disclosure. Also, the lead cover portion 83 corresponds to one example of an electric conduction cover area of the present disclosure.

A display main body 90 includes the circuit board 30, the LEDs 41 to 45, the two large lenses 60, the coupled lens 70, the seven leads 50, and the resin member 80.

Figure 11:
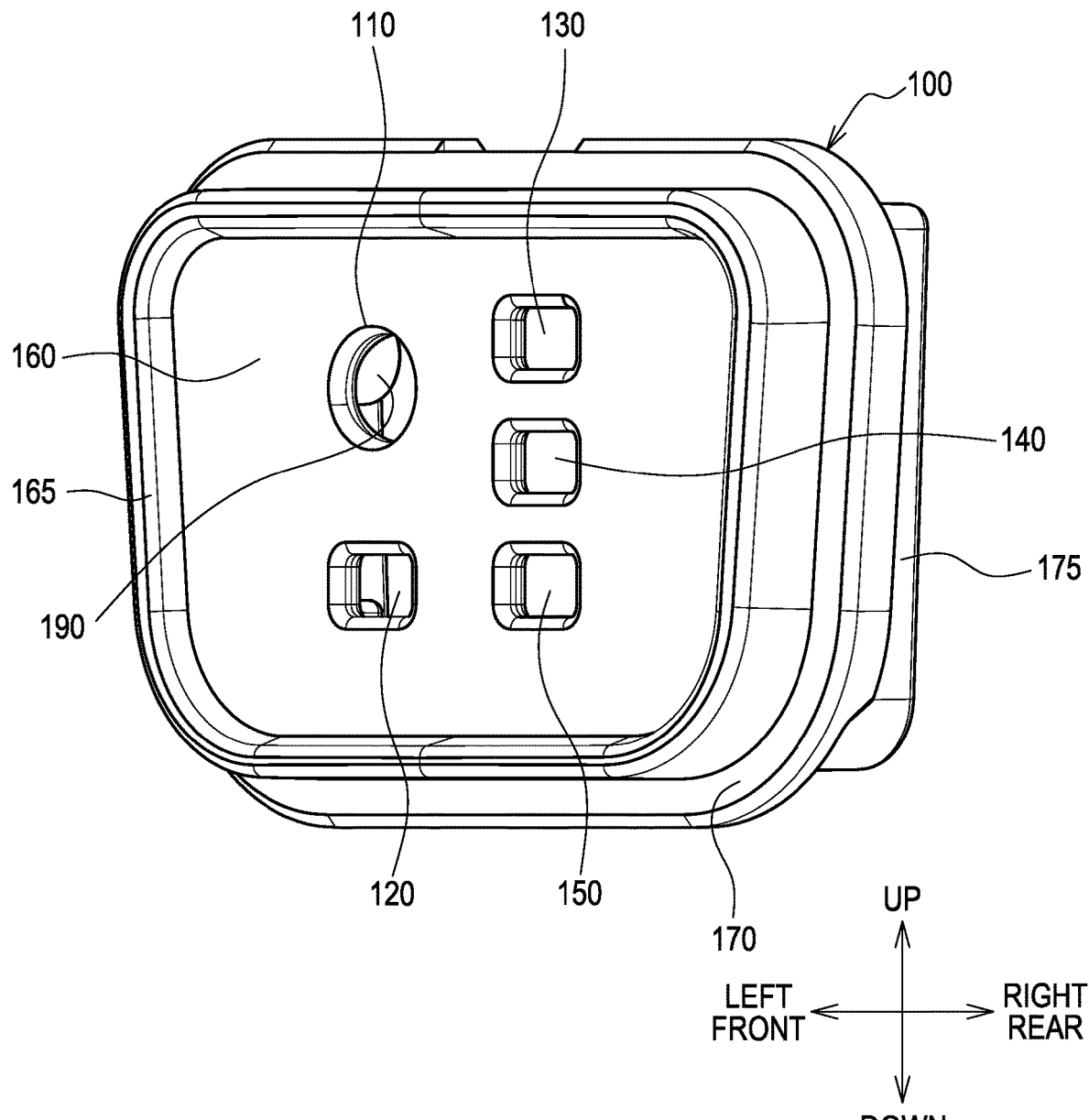
FIG. 11 is a perspective view showing a display cover to be attached to the circuit board.
Figure 12:
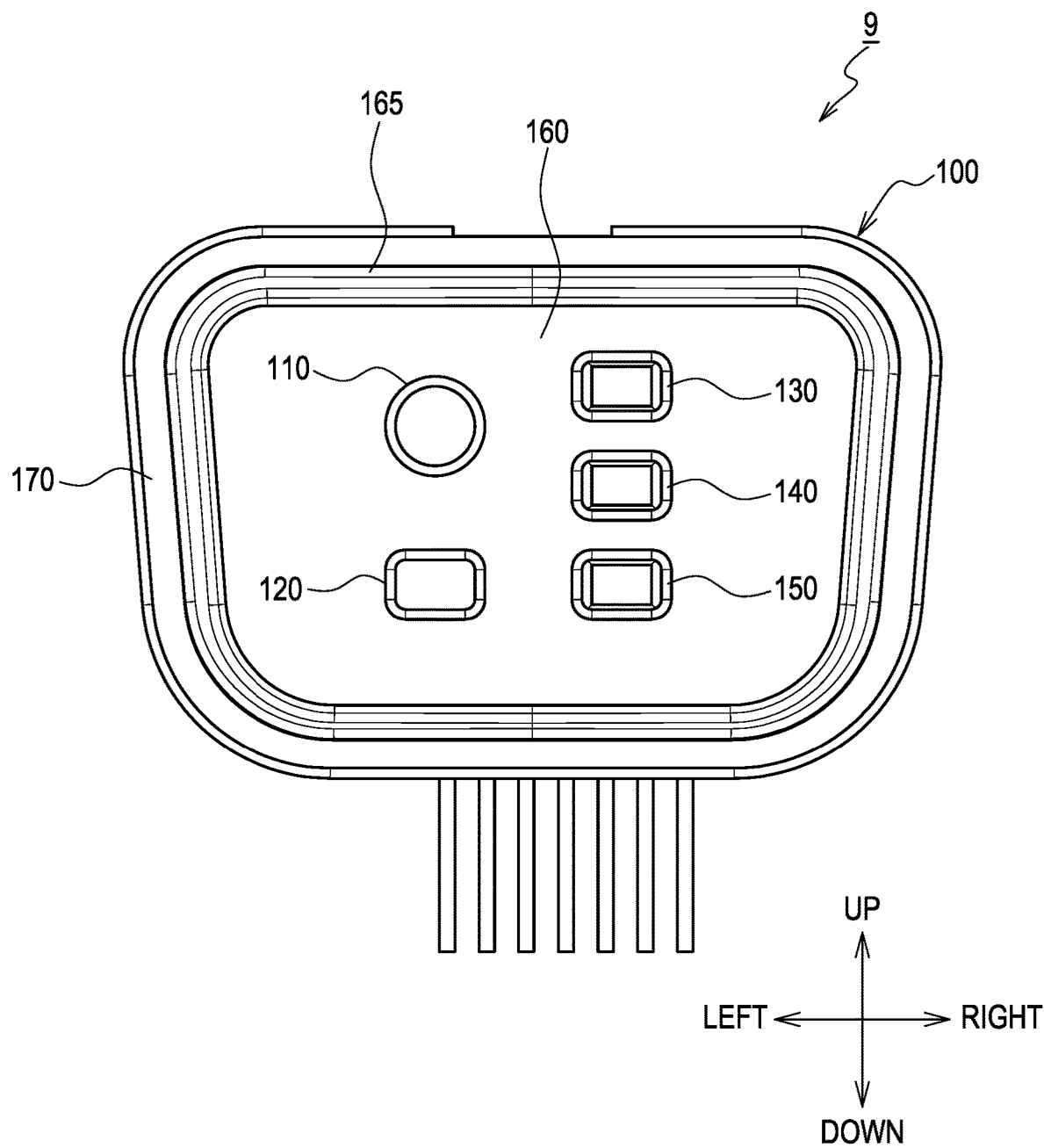
FIG. 12 is a plan view showing a state where the display cover is attached to the circuit board.
Figure 13:
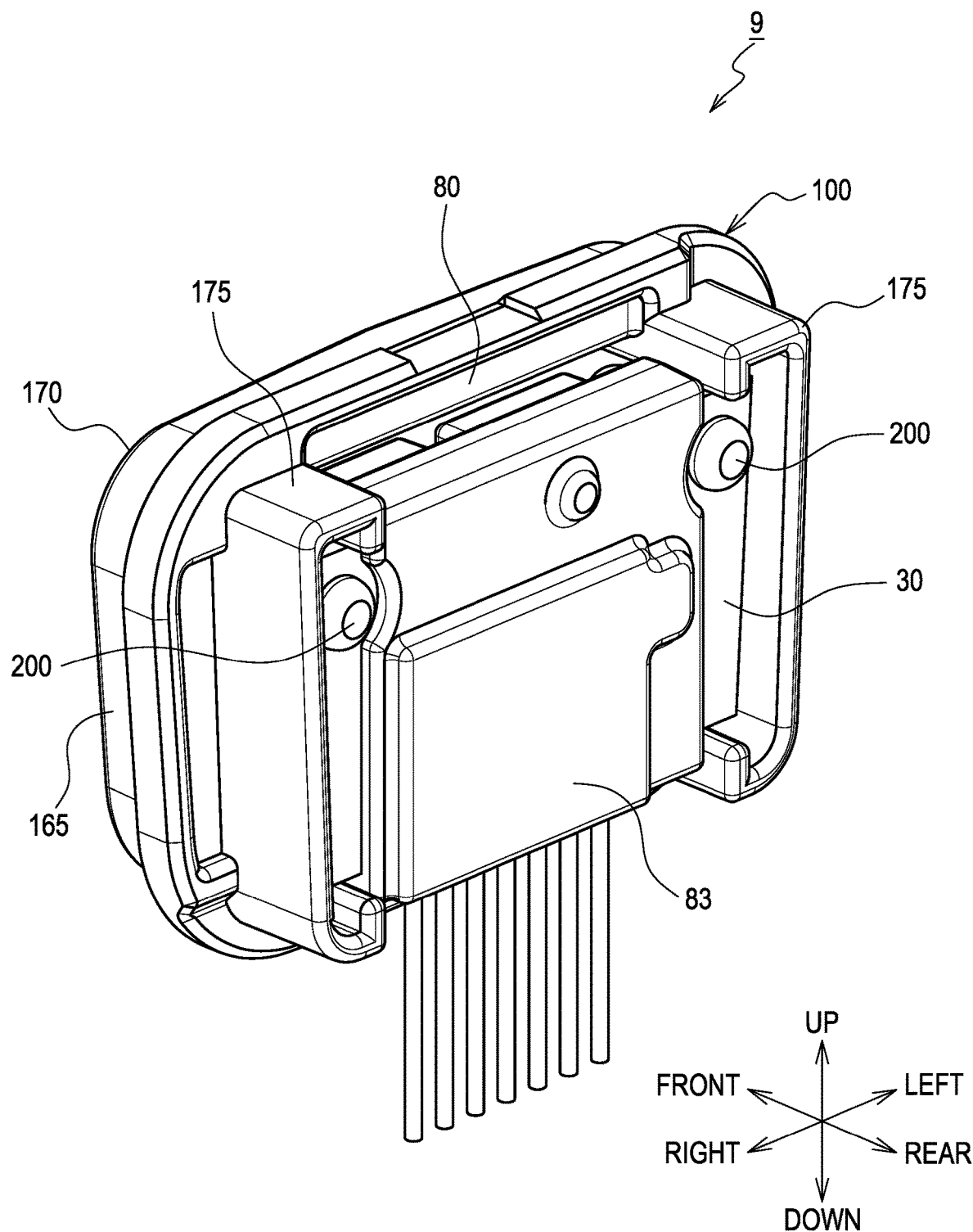
FIG. 13 is a perspective view showing a state where the display cover is attached to the circuit board.

As shown in FIGS. 11 to 13, the display 9 further includes the display cover 100 made of resin and attached to the display main body 90. The display cover 100 includes a cover base portion 170, an outer wall portion 165, a front surface portion 160, two cover protrusions 190, and two holders 175.

The cover base portion 170 has a rectangular shape with respective lengths in the up-down direction and the left-right direction slightly greater than those of the circuit board 30.

The two cover protrusions 190 each having a tubular shape protrude toward the rear side from an upper-left position and an upper-right position of the cover base portion 170. The two cover protrusions 190 are aligned to the attachment holes 37, 38 formed in the circuit board 30. The aligned two cover protrusions 190 and attachment holes 37, 38 are each coupled with a tapping screw 200. As a result, the display cover 100 is attached to the display main body 90, to thereby form the display 9.

The two holders 175 protrude toward the rear side from right and left sides of the cover base portion 170. The right holder 175 is arranged rightward of the right cover protrusion 190, and the left holder 175 is arranged leftward of the left cover protrusion 190. The holders 175 each include a plate member extending along the up-down direction as well as L-shaped members connected to an upper end and a lower end of the plate member. The plate member of the holder 175 has a slightly greater length along the up-down direction than a length of the circuit board 30 along the up-down direction. The two holders 175 hold right and left ends of the circuit board 30 that are not covered with the resin member 80 in a state where the display cover 100 is attached to the display main body 90.

The front surface portion 160 is a rectangular surface, and the outer wall portion 165 protrudes frontward from the cover base portion 170 and surrounds the front surface portion 160. The outer wall portion 165 is arranged inward of an outer periphery of the cover base portion 170. The front surface portion 160 faces the first lens cover portion 81 and the second lens cover portion 82 in a state where the display cover 100 is attached to the display main body 90.

Further, the front surface portion 160 includes a circular window 110 and four square windows 120, 130, 140, 150. The circular window 110 is arranged at a position corresponding to the light emitting surface 41a of the LED 41. The square windows 120, 130, 140, 150 are arranged at positions corresponding respectively to the light emitting surfaces 42a, 43a, 44a, 45a of the LEDs 42, 43, 44, 45.

In the state where the display cover 100 is attached to the display main body 90, there is a gap along the front-rear direction between the front surface portion 160, and the front surfaces 64 of the large lenses 60 and the front surfaces 78 of the small lenses 71. Respective end portions of the front surfaces 64 and the front surfaces 78 are covered with the resin member 80. Thus, diffusion of lights emitted from the light emitting surfaces 41a, 42a, 43a, 44a, 45a in the gap along the front-rear direction is inhibited. As a result, the light emitted from each of the light emitting surfaces 41a, 42a, 43a, 44a, 45a propagates through a corresponding one of the circular window 110 and the square windows 120, 130, 140, 150 with reduced interference with the lights emitted from the others of the light emitting surfaces 41a to 45a.

Also, since the respective end portions of the front surfaces 64 and the front surfaces 78 are covered with the resin member 80, a thickness of the resin member 80 allows a gap between the display cover 100, and the front surfaces 64 and the front surfaces 78. Thus, direct contact with the front surfaces 64 and the front surfaces 78 can be avoided, and friction of the front surfaces 64 and the front surfaces 78 can be reduced.

The display 9 further includes a seal member, which is a not-shown transparent plastic sheet, affixed to the front side of the front surface portion 160. Since the seal member is affixed to the front surface portion 160, the circular window 110 and the square windows 120, 130, 140,150 are sealed.

<3. Effects>

According to the first embodiment as described above, the following effects can be achieved:

(1) The LEDs 41, 42, 43, 44, 45 provided on the circuit board 30 are covered with the large lenses 60 and the small lenses 71. Also, the surroundings of the large lenses 60 and the small lenses 71 are covered with the resin member 80 and secured to the circuit board 30. Thus, the large lenses 60 and the small lenses 71 are less likely to come off the circuit board 30. The large lenses 60 and the small lenses 71 are friction-resistant as compared with a plastic sheet. Further, the leads 50 are also covered with the resin member 80. Accordingly, it is possible to inhibit infiltration of liquid into the LEDs 41, 42, 43, 44, 45 and the leads 50, thereby achieving an improved waterproof performance of the display 9.

(2) The LEDs 41, 42 are covered with the respective large lenses 60, and the LEDs 43, 44, 45 are covered with the respective small lenses 71. Accordingly, an improved waterproof performance of the LEDs 41, 42, 43, 44, 45 can be achieved.

(3) The first wall portion 81b is provided between the adjacent large lenses 60, and the second wall portion 82b is provided between the adjacent small lenses 71. Accordingly, an improved waterproof performance of the LEDs 41, 42, 43, 44, 45 can be achieved.

(4) The resin member 80 colored in the light-shielding color can reduce interference of the lights emitted from the LEDs 41, 42, 43, 44, 45. Particularly, providing the first wall portion 81b and the second wall portion 82b colored in the light-shielding color can appropriately reduce interference of the lights emitted from the LEDs 41, 42, 43, 44, 45.

(5) Since the metal portions 51 of the leads 50 are covered with the lead cover portion 83, adhesion of liquid to the metal portions 51 can be inhibited. Thus, occurrence of failures, such as short-circuit, during electric conduction can be reduced.

(6) Since the first lens cover portion 81, the second lens cover portion 82, and the lead cover portion 83 are integrally formed with resin, the resin member 80 is less likely to come off as compared with separately formed portions. Thus, an improved waterproof performance of the display 9 can be achieved.

(7) Since the large lenses 60 and the small lenses 71 are transparent, the lights emitted from the LEDs 41, 42, 43, 44, 45 are easily visible.

(8) The surroundings of the large lenses 60 and the small lenses 71 are covered with the first outer peripheral portion 81a, the first wall portion 81b, the second outer peripheral portion 82a, and the second wall portions 82b, excluding the respective facing parts, which face the light emitting surfaces 41a, 42a, 43a, 44a, and 45a of the LEDs 41, 42, 43, 44, and 45. Accordingly, the lights emitted from the light emitting surfaces 41a, 42a, 43a, 44a, and 45a are visible through the large lenses 60 and the small lenses 71 secured to the circuit board 30.

(9) Coupling of the three small lenses 71 with the coupling portion 72 enables easy positioning of the three small lenses 71 relative to the circuit board 30. On the other hand, the two large lenses 60 are not coupled to each other, and thus arrangement of the LEDs 41 and 42 may be changed depending on a type of the job-site tool. That is, it is possible to achieve the display 9 applicable to various types of job-site tools while enabling easy positioning of the small lenses 71.

Other Embodiments

Although one embodiment to implement the present disclosure has been described above, the present disclosure is not limited to the above-described embodiment, but may be implemented in various modified forms.

(a) Although the leads 50 are connected to the respective LEDs 41, 42, 43, 44, and 45 in the above-described embodiment, the present disclosure is not limited to the above-described embodiment. The seven leads 50 may be assembled to form a single cable and then connected to a cable connector. Also, an LED connector connected to the LEDs 41, 42, 43, 44, and 45 may be provided to the circuit board 30. In this case, upon connection of the cable connector to the LED connector, current conduction to the LEDs 41, 42, 43, 44, and 45 can be provided. Also in this case, the cable connector and the LED connector, which correspond to a metal coupling member, are covered with a resin member.

(b) Although the display 9 includes the five LEDs 41, 42, 43, 44, and 45 in the above-described embodiment, the number of LEDs is not limited to five but may be one or more. There is no limitation to an emission color or a size of each of the LEDs. Also, lenses to cover the LEDs may be appropriately provided depending on the number and the sizes of the LEDs. The shape of the lens is not limited to rectangular, but may be, for example, hemispherical.

(c) In the above-described embodiment, the grass cutter 1 is shown as one example of the job-site tool. However, the technique of the present disclosure may be applied to other job-site tools for use in job-sites for home carpentry, manufacturing, gardening, construction, and so on. Specifically, the technique of the present disclosure may be applied to, for example, electric power tools for stone processing, metal processing, and wood processing, working machines for gardening, electric apparatuses for preparing the environments of job sites. More specifically, the technique of the present disclosure may be applied to a laser marking device, an electric hammer, an electric hammer drill, an electric drill, an electric driver, an electric wrench, an electric grinder, an electric circular saw, an electric reciprocating saw, an electric jigsaw, an electric cutter, an electric chainsaw, an electric hedge trimmer, an electric lawn mower, an electric grass trimmer, an electric cleaner, an electric blower, an electric sprayer, an electric spreader, an electric dust collector, a work light, a radio, a loud speaker, and so on. Also, the job-site tool may be a grass cutter that includes an engine to generate a driving force for driving a cutting blade and a starter motor to generate a rotational force by direct-current power from a battery, to thereby provide an initial rotation of a crankshaft of the engine. Further, the job-site tool may be a tool including an engine and a starter motor, or a working machine for gardening. By applying the technique of the present disclosure particularly to working machines for outdoor use, a great advantage can be obtained.

(d) A plurality of functions performed by a single element in the above-described embodiments may be achieved by a plurality of elements, or a function performed by a single element may be achieved by a plurality of elements. Also, a plurality of functions performed by a plurality of elements may be achieved by a single element, or a function performed by a plurality of elements may be achieved by a single element. Further, a part of a configuration in the above-described embodiments may be omitted. Moreover, at least a part of a configuration in the above-described embodiments may be added to, or may replace, another configuration in the above-described embodiments.

What is claimed is:

1. A job-site tool comprising:
   a display configured to display information regarding the job-site tool, the display comprising:
   a circuit board;
   at least one light emitter on the circuit board;
   an electric conduction member configured to supply direct-current power to the at least one light emitter;
   at least one lens on the circuit board that covers the at least one light emitter; and
   a resin member (i) securing the at least one lens to the circuit board and (ii) including a lens cover area and an electric conduction cover area, the lens cover area covering surroundings of the at least one lens, and the electric conduction cover area covering the electric conduction member.

2. The job-site tool according to claim 1, wherein
   the at least one light emitter includes light emitters,
   the at least one lens includes lenses,
   the light emitters are in an array on the circuit board, and
   the lenses cover the light emitters.

3. The job-site tool according to claim 2, wherein
   the lens cover area includes at least one wall, and
   the at least one wall is between two adjacent ones of the lenses.

4. The job-site tool according to claim 2, wherein the resin member is colored in a light-shielding color.

5. The job-site tool according to claim 1, wherein the electric conduction member includes a metal coupling member coupled to the at least one light emitter.

6. The job-site tool according to claim 1, wherein the lens cover area is integral with the electric conduction cover area.

7. The job-site tool according to claim 1, wherein the at least one lens is transparent.

8. The job-site tool according to claim 1, wherein
   the at least one light emitter includes a light emitting surface configured to emit light,
   the at least one lens includes a facing surface that faces the light emitting surface, and
   the lens cover area covers an outer peripheral portion of the facing surface.

9. The job-site tool according to claim 1, wherein the at least one lens includes two or more lenses, and the two or more lenses are coupled to one another.

* * * * *